United States Patent [19]

Barton et al.

[11] Patent Number: 4,950,051
[45] Date of Patent: Aug. 21, 1990

[54] ELECTROMAGNETIC BEAM SWITCH ESPECIALLY FOR LASER RESONATORS

[75] Inventors: Udo Barton; Gerhard Ruf, both of Munich, Fed. Rep. of Germany

[73] Assignee: Messerschmitt-Boelkow-Blohm GmbH, Munich, Fed. Rep. of Germany

[21] Appl. No.: 399,267

[22] Filed: Aug. 28, 1989

[30] Foreign Application Priority Data

Aug. 27, 1988 [DE] Fed. Rep. of Germany ....... 3829166

[51] Int. Cl.⁵ .................. G05D 25/02; G02B 26/00
[52] U.S. Cl. .................................... 350/269; 350/315; 350/266
[58] Field of Search ............... 350/315, 269, 266, 273; 250/498.1

[56] References Cited

U.S. PATENT DOCUMENTS

| | | | |
|---|---|---|---|
| 4,033,693 | 7/1977 | Payrhammer et al. | 350/269 X |
| 4,415,231 | 11/1983 | Kaczensky et al. | 350/269 |
| 4,529,270 | 7/1985 | Moss et al. | 350/315 |

FOREIGN PATENT DOCUMENTS

| | | |
|---|---|---|
| B26482 | 7/1943 | Fed. Rep. of Germany . |
| G7823716 | 1/1981 | Fed. Rep. of Germany . |
| 3031908 | 3/1982 | Fed. Rep. of Germany . |

*Primary Examiner*—Bruce Y. Arnold
*Assistant Examiner*—David R. Parsons
*Attorney, Agent, or Firm*—W. G. Fasse; D. H. Kane, Jr.

[57] ABSTRACT

An electromagnetic beam switch for a laser resonator or generator, specifically for the guided or controlled transmission of light into a light conductor has two electrically controllable rotary magnets arranged in twin fashion for redundancy. Each rotary magnet operates a filter glass plate to tilt these plates into the beam path for interrupting the beam generation. The plates (13a, 13b) cooperate with respective switch contacts in corresponding switches (14, 15) arranged so that during activation, that is during switching-on, both rotary magnets (11, 12) are connected in parallel with each other. Upon completion of a "flight phase" or switch over phase the rotary magnets are automatically connected in series with each other to operate at half power as compared to the initial full power energizing phase. RC-components are arranged to prevent a constant activation of the magnets.

3 Claims, 2 Drawing Sheets

ELECTROMAGNETIC BEAM SWITCH ESPECIALLY FOR LASER RESONATORS

CROSS-REFERENCE TO RELATED APPLICATION

The present application relates to my copending patent application, Ser. No. 7/399,262, filed on the same date as the above identified patent application, and entitled: APPARATUS FOR PROTECTING A LASER, now U.S. Pat. No. 4,951,288.

FIELD OF THE INVENTION

The invention relates to an electromagnetic beam switch especially for a laser resonator, specifically for the guided or controlled transmission of light into a light conductor.

BACKGROUND INFORMATION

Such switches are known in the prior art, but there is room for improvement. These switches must open and close a laser beam path with accuracy and without undesirable delay. Therefore, at the moment of activation, the control elements of conventional electromagnetic switches for opening and closing receive double the power received during normal continuous operation. Therefore, conventional switches of this type require so-called overload protection mechanisms, which increase the technical effort and expenditure. Another disadvantage resides in the fact that these protection means are an additional source of error and failure.

German Patent No. DE-3,031,908 C2 (Kazensky et al.) published on Mar. 11, 1982 discloses a beam switch wherein the filter means are operated by an electromagnet having a linearly moving armature which tilts an arm or arms carrying the filter means. Such switches are relatively slow and require the above mentioned over-load protection.

German Utility Model Publication No. DE-7,823,716 U1 and German Patent Publication No. B 26482 of July 16, 1943 disclose energizing circuits for electromagnets including RC-networks which make sure that after a certain time delay following switch-on the holding force of the magnet is reduced to a certain proportion of the initial holding force. Any use of such circuits for laser beam switches is not suggested in these references.

OBJECTS OF THE INVENTION

In view of the above it is the aim of the invention to achieve the following objects singly or in combination:

to construct a beam switch for a laser resonator, which switch can function free of faults at a higher switching-on speed and with a higher switching-on force;

to provide a switch of this type that has a substantially shorter beam interruption time than was possible heretofore, and to assure a rapid switch-on and switch-off of the laser resonator or generator;

to construct a laser beam switch in a redundant manner to improve its safety and to switch-off a laser generator with certainty when at least one filter plate is switched into the laser beam path and to switch-on the laser generator when both filter plates are outside the laser beam path; and to provide a distinctly higher switching-on power than the power applied to the switch during its continuous "on" state, in which the filter plate or plates interrupt the laser beam path and hence switch off the laser generator or resonator.

SUMMARY OF THE INVENTION

An electromagnetic beam switch for a laser resonator, specifically for the guided or controlled transmission of light in a light conductor, according to the invention, comprises two electrically controllable rotary magnets each of which carries a filter glass plate. Both plates are tilted into the beam path by the rotation of the magnets when the magnets are energized. During switching-on both rotary magnets (11, 12) or rather their energizing coils, are connected in parallel with each other. During a "flight" phase when the contacts are switched over, the magnets are automatically connected in series. An RC-component is arranged for each magnet to prevent a constant or continuous energization or permanent holding of the magnets to assure a rapid switch-off of the magnets, for example, when a rotary magnet should be jammed.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
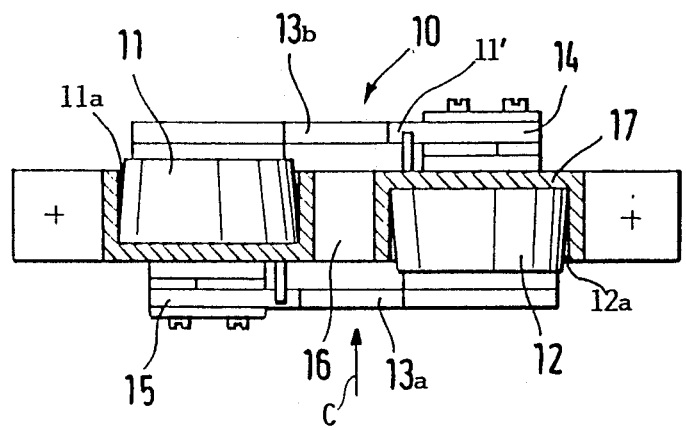
FIG. 1 is a top plan view, partially in section, of an electromagnetic beam switch according to the invention with all operating elements including two rotary magnets arranged in twin fashion for redundancy.
Figure 2:
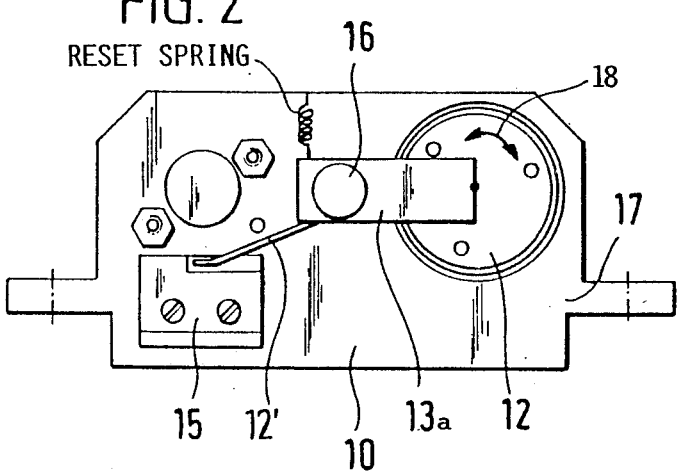
FIG. 2 shows a side view of the present switch as viewed in the direction of the arrow C in FIG. 1.

FIGS. 1 and 2 show an example embodiment of the present electromagnetic beam switch 10 with two rotary magnets 11 and 12. One rotary magnet 11 is mounted for rotation in a respective socket 11a on one side of a mounting bracket 17. The other rotary magnet 12 is mounted for rotation in a respective socket 12a on the other side of the bracket 17. The rotors of both magnets rotate in opposite directions for moving their respective filter glass plates 13a, and 13b in unison or synchronism into and out of a laser beam path 16 through the mounting bracket 17. The laser beam path 16 has a specific or given diameter, which is fully shielded or covered by the filter glass plates 13a and 13b. The beam path extends between the rotary magnet sockets 11a and 12a. The filter glass plates 13a and 13b are attached to the rotors of the rotary magnets 11 and 12, respectively. It is known that the introduction of an appropriate filter glass into the beam path of a laser resonator will cause the latter not to start resonating or the filter will stop a resonating resonator.

Figure 3:
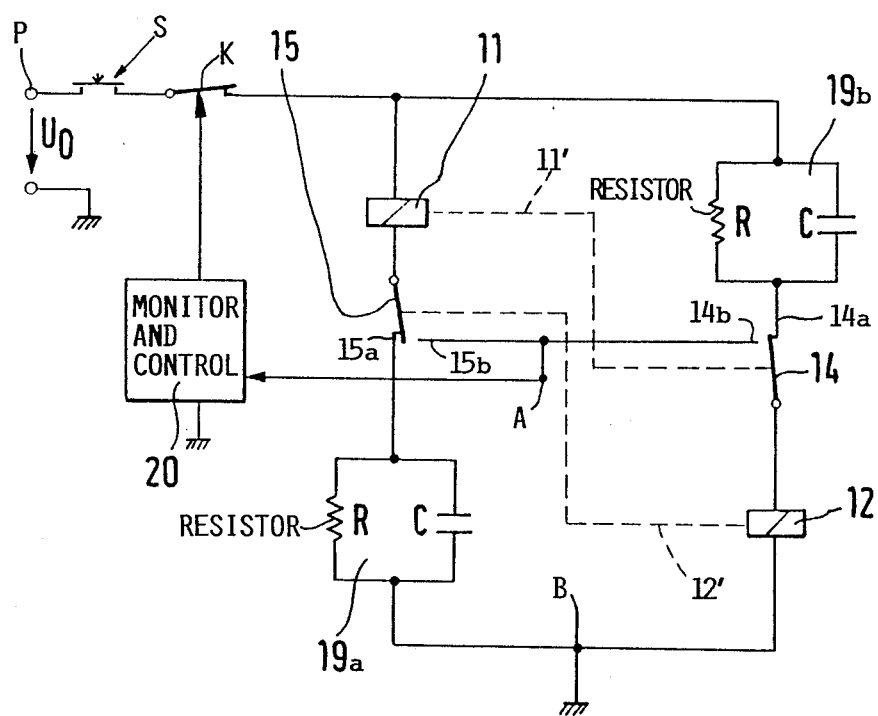
FIG. 3 is a circuit diagram for energizing the two rotary magnets and including a protection mechanism.

As can be seen in FIGS. 1 and 2, each filter glass plate 13a and 13b tilted by its magnet 11 or 12, is connected by a respective switch operating element 11' and 12' to a respective switch 14 or 15 for causing a mechanical switch over of the respective switch contacts 14a, 14b and 15a, 15b shown in FIG. 3.

Referring to FIG. 3 the operation of the present switch will now be described. First, the electromagnetic rotary magnets 11, 12 are energized by closing a normally open switch S. These magnets act as control or rather operating members for the glass plates 13a, 13b and hence for the operating elements 11', 12'.

Closure of the switch S, e.g. by an operator, provides an energizing circuit for the rotary magnet 11 as follows: power supply P, closed switch S, normally closed contact K, coil of magnet 11, normally closed contact 15a of switch 15, R-C network 19a, ground. Closure of switch S also establishes an energizing circuit for the rotary magnet 12 as follows: power supply P, closed switch S, normally closed contact K, R-C network 19b, normally closed contact 14a of switch 14, coil of magnet 12, ground. These energizing circuits are connected in parallel to each other, so that initially both magnets receive the full energy for rapidly bringing the filter glass plates 13a, 13b into the beam interrupting position shown in FIG. 2.

When the filter glass plates 13a, 13b reach the position shown in FIG. 2, the respective switch operating elements 11' and 12' open the normally closed contacts 14a and 15a and, after a short duration flight phase, close the normally open contacts 14b and 15b, thereby connecting the two magnets 11 and 12 in series with each other to now operate at a reduced power to save energy and to enable the use of a relatively small spring force for the resetting of the filter glass plates 13a, 13b into a position out of the beam path 16 to thereby switch on the resonator (not shown) while the beam switch 10 itself is deenergized.

Due to the initial parallel connection as described above the magnets 11 and 12 receive two times the power for the initial energization than they normally receive during continuous operation, whereby a rapid interruption of the laser beam generation and a rapid resetting of the plates 13a, 13b to rapidly open the beam path 16 are assured. The coils of both rotary magnets 11, 12 may, for example, be energized by a 12V power supply $P(U_o)$ shown in FIG. 3. Upon completion of the "flight phase" the magnets 11, 12 are automatically connected in series with each other, whereby each magnet coil is only connected to 6 V for operation at half power as mentioned above.

FIG. 3 also shows a monitoring and control circuit 20 connected between point A and ground B. The circuit 20 senses the presence of a high impedance between points A and B. Such a presence means that at least one of the contacts 14a and 15a is not in the supposed normally closed condition. In that case the circuit must not be able to be energized. Therefore, the circuit 20 opens the normally closed contact K thereby preventing any operation of the circuit. When the impedance between A and B is normal, it signifies that contacts 14a and 14b are closed and hence the circuit is ready for energizing the magnets 11, 12 because under this condition the contact K is also kept closed.

The R-C-networks 19a and 19b make sure that initially a high switch-on d.c. current can flow resulting in a rapid tilting of the filter glass plates 13a, 13b into the beam interrupting position shown in FIG. 2. The R-C-networks also assure a rapid switch-off if one of the magnets 11, 12 should be jammed so that one of the switches 14, 15 would not be in the normally closed condition with the respective contact 14a, 15a. In that case only a small energy build-up is possible in the respective other capacitor C so that the magnets cannot be held for any longer time period. Thus, the R-C-networks in combination with the monitoring circuit 20 provide a double safety feature.

Although the invention has been described with reference to specific example embodiments, it will be appreciated that it is intended to cover all modifications and equivalents within the scope of the appended claims.

What we claim is:

1. An electromagnetic beam switch, especially for interrupting a laser beam path, comprising two rotary electromagnets arranged for rotation on a mounting bracket, a filter glass plate connected to each of said rotary magnets for tilting both filter glass plates into said laser beam path, two electrical switches arranged to be operated by a respective one of said filter glass plates, each switch having a normally closed contact and a normally open contact, a magnet energizing electric circuit means in which said normally closed contacts connect said electromagnets initially in parallel with each other for energization at full power and in which a closing of said normally open contacts by said filter glass plates connects said magnets in series with each other for continuing energization at half power, said circuit means further comprising an R-C-network means connected to said electromagnets for preventing a permanent or prolonged holding of said electromagnets.

2. The switch of claim 1, wherein each of said R-C-networks is arranged in series with its respective electromagnet as long as said electromagnets are connected in parallel with each other during an initial energization, and wherein said R-C-networks are switched off when said electromagnets are connected in series.

3. The switch of claim 1, further comprising a monitoring and control circuit (20) arranged for ascertaining whether said normally closed contacts are actually closed and for preventing energization of said circuit means if one of said normally closed contacts (14a, 15a) is not actually closed.

* * * * *